United States Patent [19]

Gombrich et al.

[11] Patent Number: 4,818,850
[45] Date of Patent: Apr. 4, 1989

[54] METHOD AND APPARATUS FOR ATTACHING BAR CODE INDICIA ON ITEMS

[75] Inventors: Peter P. Gombrich; Donna L. Seeland, both of Boulder, Colo.

[73] Assignee: CliniCom Incorporated, Boulder, Colo.

[21] Appl. No.: 72,102

[22] Filed: Jul. 10, 1987

[51] Int. Cl.⁴ .......................................... G06K 19/06
[52] U.S. Cl. .................................... 235/494; 235/472
[58] Field of Search ................ 235/472, 494; 156/542

[56] References Cited

U.S. PATENT DOCUMENTS 4,264,396 4/1981 Stewart ............................... 156/542

OTHER PUBLICATIONS

Bar Code News, May/Jun., 1984, p. 65 and Flyleaf.
Photo Exhibits A-I Showing Avery Product.
Catalogue Page Showing Draphix Dot Product.

Primary Examiner—Harold I. Pitts
Attorney, Agent, or Firm—Merchant, Gould, Smith, Edell, Welter & Schmidt

[57] ABSTRACT

A continuous strip bar code label (10) bearing bar code indicia thereon. The continuous strip bar code label (10) has an edge (13) which facilitates tearing of the continuous strip bar code label (10) transversely of its length whereby the continuous strip bar code label (10) can be readily separated into individual bar code labels of various lengths.

33 Claims, 6 Drawing Sheets

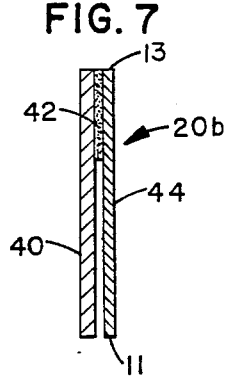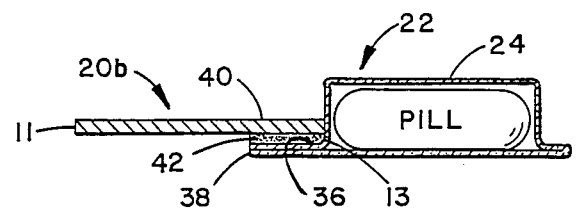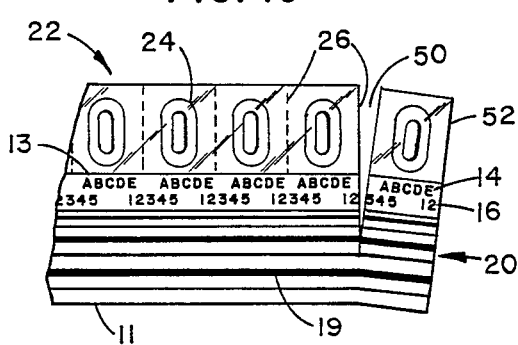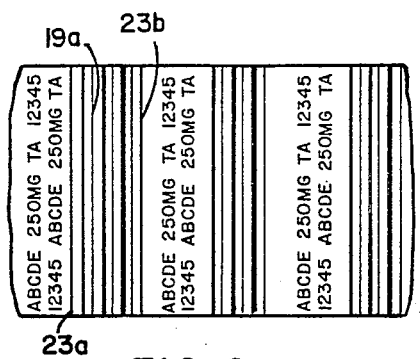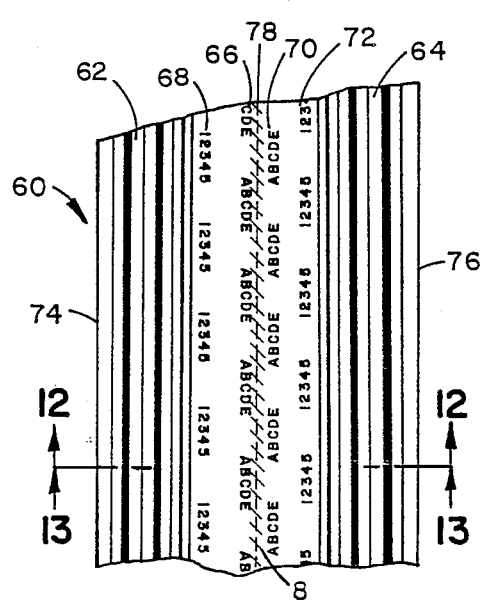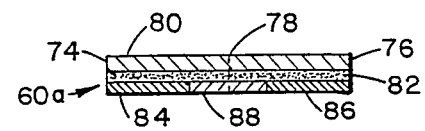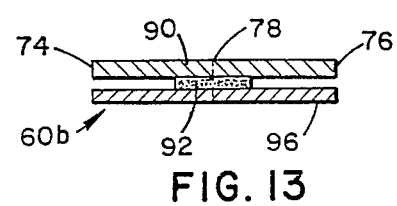

METHOD AND APPARATUS FOR ATTACHING BAR CODE INDICIA ON ITEMS

BACKGROUND OF THE INVENTION

The present invention relates generally to the field of bar coding items. More particularly, the present invention relates to a bar code label and the method of attaching a bar code label to medications or other items. The present invention is specifically described with respect to the bar coding of medications, but the principles involved are also applicable to bar coding other items.

In the last two decades, hospital pharmacies have instituted unit dose dispensing. This means that each individual dose of medication is packaged separately. For example, aspirin would be packaged such that there would be one aspirin tablet in each package. During this period, the process has evolved from the individual pharmacy labelling and packaging every unit dose to the vast majority of unit doses dispensed being packaged by the drug manufacturer. Unit dose medication packages are usually 1×10 or 2×5 packages.

As a rule, the individual pharmacy still labels and/or bar codes each of the individual unit doses because the drug manufacturer usually only has a bar code on a bulk package containing many unit dose packages. It is anticipated, however, that bar coding in the not too distant future will be the responsibility of the manufacturer. In the meantime, there is a need for a method and apparatus which will allow for bar coding by the hospital pharmacy in an inexpensive and automated fashion.

Placing a bar code on each unit dose package facilitates positive drug identification and administration charting at the patient's bedside because the bar code identifies the drug type, dosage and manufacturer. A nurse, using a bar code reading device, can scan the bar code attached to a unit dose package and thus make a record of and double check the medication and dosage being administered to the patient with that which was prescribed. Thus, a system of attaching a bar code easily and inexpensively to each unit dose package medication is highly desirable. Attachment of the bar code can occur in any location in the drug distribution chain prior to administration.

The present invention solves the problem of labelling different sizes of unit dose medication packages quickly and accurately as well as other problems with labelling unit dose medication packages.

SUMMARY OF THE INVENTION

The present invention provides a method and apparatus for attaching a bar code to items such as unit dose medication packages.

According to one embodiment of the present invention, an adhesive layer is affixed to a surface of a continuous strip label. A continuous bar code is printed lengthwise on a surface of the continuous strip label.

In one embodiment, the adhesive layer is continuous and yet another embodiment the adhesive layer is non-continuous.

The present invention provides for minimal disruption of existing packaging systems. The self-adhesive bar code labels of the present invention can be attached to virtually any existing unit dose packages and other packaging regardless of shape or size. The present invention is also compatible with manufacturer bar coding of drugs and other products. The present invention provides these advantages with minimum cost and ease of use.

According to one embodiment of the invention, the continuous strip label bearing the bar code indicia tears only transversely substantially in a straight line easily and neatly, anywhere along its length. Moreover, the continuous strip label can be rolled up and dispensed from inexpensive dispensers such as that used for transparent tape. In addition, the continuous strip label can be fan folded and dispensed from a dispenser.

According to one embodiment of the invention, a partial adhesive layer is affixed to a lengthwise section of the bottom side of a continuous strip label. A removable backing, herein also referred to as a release liner, is attached to the partial adhesive layer. A bar code is printed lengthwise on the top side of the continuous strip label.

According to one embodiment of the invention, an identifying number and an identifying name of the item are printed on the top side of the continuous strip bar code label along with the bar code. In yet other embodiments, the unit dosage and/or the form of administration such as tablet form, inspection, etc. is also printed on the top side of the continuous strip.

According to one embodiment of the invention, a length of continuous strip bar code label is pulled out from a roll of continuous strip bar code label housed in a dispenser. The bar code label is affixed to an item by pressing the exposed adhesive layer of the label onto the item. The length of continuous bar code label is separated from the roll by tearing it off on a sharp edge of the dispenser.

In a preferred embodiment, a release liner is peeled off the back of the length of continuous strip bar code label to expose the adhesive layer.

In a preferred embodiment, a continuous strip bar code label is provided which has an adhesive layer affixed to the bottom side of a continuous strip label. The continuous strip bar code label has a release liner attached to the adhesive layer such that the whole adhesive layer is covered. A bar code is printed lengthwise on the top of the continuous strip label.

According to yet another embodiment of the invention, a continuous strip bar code label is provided which has an adhesive layer affixed to the bottom side of a continuous strip label. The continuous strip bar code label has a nonremovable backing and a release liner attached to the adhesive layer such that the whole adhesive layer is covered. A bar code is printed lengthwise on the top of the continuous strip label.

In yet another embodiment of the present invention, the adhesive layer will not be covered by a release liner. In this embodiment, the adhesive is readily separated from the bar code strip label such that the bar code can be rolled into a spool and dispensed from a dispenser.

Yet another embodiment of the invention provides for making a multiple width continuous strip bar code label such as two-wide or four-wide, wherein multiple strip bar code labels are disposed side-by-side in readily separable fashion. Adhesive layers are affixed lengthwise to the bottom side of each multiple strip bar code label. A release liner is attached to these adhesive zones on the bottom of the multiple strip bar code labels and covers the whole bottom side of the continuous strip bar code label. A bar code is printed lengthwise on the top side of each multiple strip bar code label. The continuous bar code label is then die cut lengthwise so that the label can be separated into multiple strip bar code labels with each label having a bar code printed lengthwise on it.

Yet another embodiment of the invention provides for the combination of a label dispenser and a continuous strip bar code label. The continuous strip bar code label has an adhesive layer affixed to the bottom side of a continuous strip label. The adhesive layer is covered with a release liner and a bar code is printed lengthwise on the top of the continuous strip label. The continuous strip bar code label is stored in the label dispenser. The label dispenser has a ledge for holding unit dose medication packages and a sharp edge for separating a length of continuous strip bar code label from the label stored in the dispenser. The dispenser also includes means for peeling off the release liner on the continuous strip bar code label as it is pulled out from the label dispenser.

Yet another embodiment of the invention provides for the combination of a label dispenser, a continuous strip bar code label and a coupler to a pill bin. The coupler engages the dispenser and the pill bin so that the dispenser and pill bin are removably.

Still another embodiment of the invention provides a continuous strip bar code label with a multiplicity of bar codes and bar patterns periodically printed transversely on the label. Each bar code is separated from an associated bar pattern by a guard bar and the groups of bar codes and bar patterns are separated by spaces. The bar codes represent information about medication and thus are unique for each different medication. The bar patterns are constant bar patterns, i.e., the same on every medication package. A bar code reader simultaneously reads a bar code and a bar pattern and then compares the reading from the bar pattern to the known constant and, if there is a deviation, adjusts the readings of the bar code to take into account the curvature of the medication packages and the speed at which the readers reads the bar code. Thus, the bar pattern is used as an index.

These and various other advantages and features of novelty which characterize the invention are pointed out with particularity in the claims annexed hereto and forming a part hereof. However, for a better understanding of the invention, its advantages, and its objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views;

FIG. 7 is a cross-sectional view of an alternative embodiment of the bar code indicia shown in FIG. 2 in accordance with the principles of the present invention;

FIG. 8 is a cross-sectional view of the embodiment of bar code indicia shown in FIG. 7 attached to a unit dose medication package in accordance with the principles of the present invention;

FIG. 9 is a plan view of a bar code label wherein the bar code indicia extends transversely of the bar code label;

FIG. 10 is a plan view of bar code indicia attached to a unit dose medication package in accordance with the principles of the present invention;

FIG. 11 is a plan view of double-width bar code indicia in accordance with the principles of the present invention;

FIG. 12 is a cross-sectional view of one embodiment of the double width bar code indicia shown in FIG. 11 in accordance with the principles of the present invention;

FIG. 13 is a cross-sectional view of an alternative embodiment of the double width bar code indicia shown in FIG. 11 in accordance with the principles of the present invention;

DETAILED DESCRIPTION OF A PREFERRED EMBODIMENT OF THE INVENTION

Figure 1:
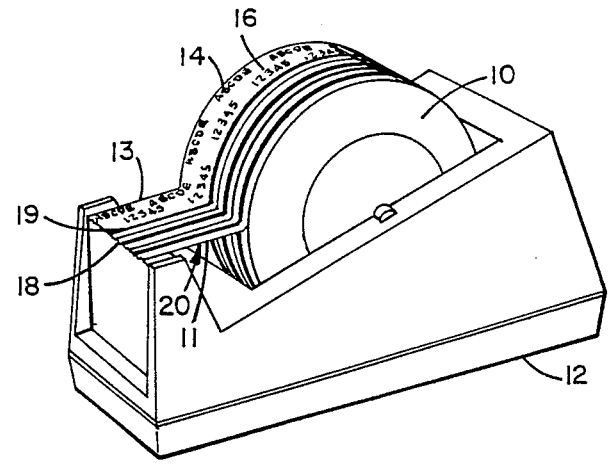
FIG. 1 is a perspective view illustrating the use of a tape dispenser for storing and dispensing the bar code indicia in accordance with the principles of the present invention.
Figure 2:
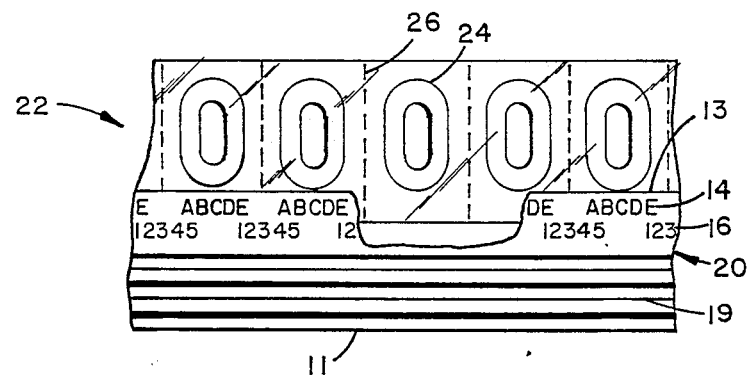
FIG. 2 is a plan view of bar code indicia attached to an item using an embodiment of the present invention.

Referring now to the drawings wherein embodiments are illustrated in accordance with the principles of the present invention; illustrated in FIG. 1 is a roll of continuous strip bar code label 10 housed in dispenser 12. As illustrated in FIGS. 1 and 2, the continuous strip bar code label on roll 10 has a longitudinally continuous bar code 19 printed on the top surface and also a drug identifying name 14 and a drug identifying number 16 printed at periodic intervals along the length of the tape. The continuous strip bar code label on roll 10 has an adhesive layer on the bottom surface. The bar code label on roll 10 is used in the same manner as a roll of cellophane tape is used. A piece of continuous strip bar code label 20 is separated from roll 10 by pulling the free end of continuous strip bar code label from roll 10 out to serrated edge 18 on dispenser 12 and pressing the label 20 down against the serrated edge 18 and tearing it off.

Figure 3:
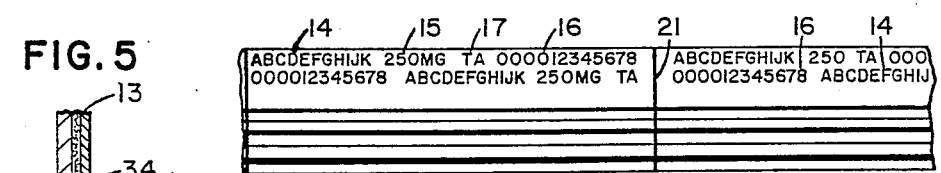
FIG. 3 is a reduced plan view of a bar code label in accordance with the principles of the present invention.

FIG. 2 shows a length of continuous strip bar code label 20 attached to a typical unit dose medication package 22. Package 22 has several individually packaged pills 24. Package 22 has perforations 26 between each of the individually wrapped pills 24. It will be appreciated that although the description hereof makes reference to bar coding of unit dosage packaging, the present invention has application to all types of packaging for a variety of items. Additionally, the bar code label 20 might have imprinted thereon additional information in varying formats. For example, as illustrated in FIG. 3, in use with unit dose medication packages, the bar code label 20 might include unit dosage 15, delivery form 17 (TA=Tablet), etc. Moreover, markings 21 might be provided to facilitate reading of the bar code label 20.

Figure 4A:
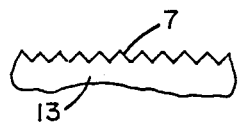
FIGS. 4A–C are fragmentary enlarged views of alternate embodiments of a top edge of a bar code label.
Figure 4B:
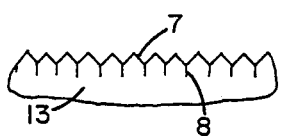
Figure 4C:
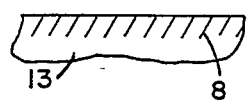

Continuous strip bar code label 20 has a top edge 13 and a bottom edge 11. Top edge 13 is a fine toothed edge so that when an individual dose of medication, pill 24, is separated from package 22 by way of perforation 26, continuous strip bar code label 20 tears easily and neatly in a perpendicular direction with respect to the length of the continuous strip bar code label 20. Alternatively, top edge 13, instead of being toothed 7, as illustrated in FIG. 4A, might be toothed with straight or diagonal fine slits 8, as shown in FIG. 4B, or might have only diagonal or straight slits 8 as shown in FIG. 4C.

Figure 5:
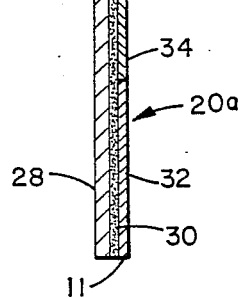
FIG. 5 is a cross-sectional view of one embodiment of the bar code indicia shown in FIG. 2 in accordance with the principles of the present invention.
Figure 6:
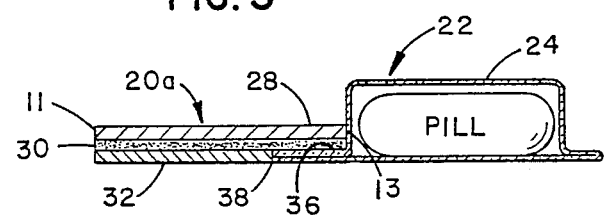
FIG. 6 is a cross-sectional view of the embodiment of bar code indicia shown in FIG. 5 attached to a unit dose medication package in accordance with the principles of the present invention.

FIGS. 5 and 6 illustrate an embodiment of the present invention. FIG. 5 is a cross-sectional view of this embodiment. Bar code label 20a is composed of a label layer 28 which is made of a material that will tear in a substantially straight line starting with the toothed edge 13 to edge 11 of bar code label 20a. The label layer 28 is an acetate film in this embodiment but it could also be a thermal paper. Also, label layer 28 must have a top surface capable of being printed on with high content carbon (black) printing inks. A coating is applied to label layer 28 to stop the ink from smearing so that bar code 19 and drug identifying name 14 and drug identifying number 16 can be printed in a permanent fashion on the top surface of label layer 28. The bottom surface of label layer 28 is coated with a permanent adhesive layer 30. (Throughout this application, the thickness of the adhesive layers as shown is exaggerated to clearly show the presence of an adhesive layer.) Adhesive layer 30 covers the entire bottom surface of label layer 28. A nonremovable backing 32 is attached to a lengthwise section of adhesive layer 30 on the bottom of bar code label 20a. Preferably, this nonremovable backing is tissue or paper and is capable of tearing easily only in a perpendicular direction with respect to the length of bar code label 20a. Nonremovable backing 32 provides bar code label 20a with sufficient body so that bar code label 20a is capable of laying flat and supporting itself straight out in a horizontal position, i.e., a flag effect. A release liner 34 is attached to the remaining lengthwise section of adhesive layer 30 on the bottom of bar code label 20a proximate the edge 13. Release liner 34 must be capable of being torn on serrated edge 18 as shown on dispenser 12 in FIG. 1.

FIG. 6 is a cross-sectional view of bar code label 20a attached to unit dose medication package 22. Release liner 34 has been removed from bar code label 20a and the exposed section of adhesive layer 30 is shown affixed to the flat portion 36 of unit dose medication package 22. The flag effect of bar code label 20a is shown in FIG. 6 as bar code label 20a extends straight out from edge 38 of unit dose medication package 22.

FIGS. 7 and 8 illustrate a preferred embodiment of the present invention. FIG. 7 is a cross-sectional view of continuous strip bar code label 20b. The first layer in bar code label 20b is label layer 40. Label layer 40 must have sufficient body to lay flat and support itself straight out in a horizontal position, i.e., a flag effect. In this preferred embodiment, label layer 40 is Kim Dura, a material made by Kimberly-Clark, but any label which tears in a substantially straight line perpendicular to its length and which has sufficient body will work. Label layer 40 is coated with a white smudge proof coating so that a bar code can be printed on label layer 40 without smearing. Thus, bar code 19 and the identifying drug name 14 and number 16 can be printed on the top surface of label layer 40 without smearing. Label layer 40 must be a material which will tear in a substantially straight line. Label layer 40 is zone coated with adhesive layer 42, i.e., adhesive layer 42 does not cover the entire bottom surface of label layer 40. Adhesive layer 42 runs lengthwise on a section of bar code label 20b and is adjacent to toothed edge 13 of bar code label 20b. Release liner 44 is affixed to adhesive layer 42 on the bottom of label 20b. Release liner 44, in this embodiment, has a width equal to the width bar code label 20b.

FIG. 8 shows the embodiment shown in FIG. 7 attached to unit dose medication package 22. Release liner 44 has been removed from bar code label 20b and the exposed adhesive layer 42 is shown affixed to a flat portion 36 of unit dose medication package 22. A significant portion of bar code label 20b extends out from flat portion 36 of unit dose medication package 22. Due to the flag effect of label layer 40, the portion of bar code label 20b that extends out from flat portion 36 supports itself in a straight horizontal position.

Bar code label 20b is readily attached to any shaped surface, such as a bottle or a bag. Bar code label 20a, shown in FIGS. 5 and 6, is ideally suited for attachment to a unit dose medication package 22, and might be less preferable for medications in bottles or other packages. The reason for this is that when release liner 34 is removed and the exposed adhesive layer 30 is affixed to the medication, the thickness of nonremovable backing 32 would cause bar code label 20a to not lay flat on medications in a bottle or a bag. It can be seen in FIG. 6 that bar code label 20a is able to lay flat on unit dose medication package 22 because only the part of the bar code label 20a which has the adhesive exposed is actually on unit dose medication package 22. Nonremovable backing 32 abuts edge 38 of unit dose medication package 22 but lays flat because it extends out from unit dose medication package 22.

A very advantageous feature of continuous strip bar code label 20 is the way that bar code 19 is printed on top of bar code label 20. The bar code is printed as a longitudinally continuous bar code and in the preferred embodiment, high content carbon (black) ink is used. Any size transverse portion of longitudinally continuous bar code 19 can be read by a bar code reader. Bar code label 20 also includes a drug identifying name 14 and number 16 so that a person affixing label 20 to a unit dose medication package 22 or administering such a unit dose is able to immediately tell what drug is involved. It will be appreciated that many of the advantages of a longitudinally continuous bar code printed lengthwise on the bar code label can also be realized by periodically printing bar codes 19a transversely on the label and including start and finish markings 23a,b or spaces between the bar codes to facilitate reading the bar code with a bar code reading device as illustrated in FIG. 9.

FIG. 10 illustrates a unit dose 52 being torn off from unit dose medication package 22. FIG. 10 shows bar code label 20 affixed to unit dose medication package 22. When it is desired to separate unit dose 52 from unit dose medication package 22, a tear 50 is made in unit dose medication package 22 using a perforation 26. Tear 50 continues through toothed edge 13 of bar code label 20. Toothed edge 13 facilitates a straight line tear in bar code label 20. Also, as mentioned above, the materials in bar code label 20 tear in a straight line direction. Therefore, when unit dose 52 is removed from unit dose medication package 22, a section of bar code label 20 remains affixed to unit dose 52. Because the bar code is printed in a longitudinally continuous manner, it does not matter where the transversely extending tear is made in bar code label 20. Thus, bar code label 20 with its longitudinally continuous bar code works on any size of unit dose medication package 22.

With the present invention, a person can easily label various sizes of unit dose medication packages with machine-readable bar code and an identifying drug name, unit dosage, delivery form, number, etc. As shown in FIG. 1, continuous strip bar code label 20 can be stored in a roll 10 housed in a dispenser 12. A person wishing to attach a length of bar code label 20 to a unit dose medication package 22 pulls out an appropriate length of bar code label 20 and presses down on serrated edge 18 of dispenser 12 to separate this length from roll 10. The exposed adhesive layer is then pressed onto unit dose medication package 22.

Dispenser 12 can also be used to dispense bar code label 20a and bar code label 20b. After a length of label is separated from the roll, release liner 34 of bar code label 20a, as shown in FIG. 5, or release liner 44 of label 20b, as shown in FIG. 7, is removed. This exposes an adhesive layer. The exposed adhesive layer is then pressed onto unit dose medication package 22.

Another embodiment of the present invention is shown in FIG. 11. FIG. 11 illustrates a double continuous strip bar code label 60 with edges 74 and 76. Double bar code label 60 has bar code 62 printed on the top surface on one-half of double bar code label 60 and bar code 64 printed on the other half of double bar code label 60. Double bar code label 60 has a drug identifying name 66 and a drug identifying number 68 printed periodically on the top of surface of double bar code label 60 near bar code 62 in a longitudinal manner. Double bar code label 60 also has a drug identifying name 70 and a drug identifying number 72 printed periodically on the top surface of double bar code label 60 near bar code 64 in a longitudinal manner. Double bar code label 60 has a perforation, or is separated, along line 78 running lengthwise. By tearing double bar code label 60 along 78, double bar code label 60 can be separated into two bar code labels, one label containing bar code 62, drug identifying name 66 and drug identifying number 68, and the other label including bar code 64 and drug identifying name 70 and drug identifying number 72. The multiple width continuous strip bar code label is described above using a double width label, but it will be appreciated that any multiple width label can be used. For instance, a four-label wide strip would have two double width bar code labels side-by-side with a perforation between them.

FIG. 12 is a cross-sectional view of double continuous strip bar code label 60a, one embodiment of the double bar code label 60 shown in FIG. 11. Label 60a in FIG. 12 has a label layer 80. In this embodiment, label layer 80 is an acetate film, but it could also be thermal paper. Label layer 80 must be made of a material that will tear in a general straight line, perpendicular to the vertically continuous bar code 62 and 64. The bottom surface of label layer 80 is coated with an adhesive layer 82. A first nonremovable backing 84 is affixed to a lengthwise section of adhesive layer 82 adjacent edge 74 of double bar code label 60a. A second nonremoval backing 86 is affixed to a lengthwise section of adhesive layer 82 adjacent edge 76 of double bar code label 60a. A release liner 88 is affixed to a lengthwise section of adhesive layer 82 between the first nonremovable backing 84 and the second nonremovable backing 86. Nonremovable backings 84 and 86 should be a material that will tear easily in a straight line perpendicular to the vertically continuous bar codes 62 and 64. Also, nonremovable backings 84 and 86 must have sufficient body to lay flat and support themselves straight out in a horizontal position, i.e., a flag effect.

FIG. 13 is a cross-sectional view of double bar code label 60b, a preferred embodiment of double bar code label 60 shown in FIG. 11. In FIG. 13, double bar code label 60b has a label layer 90. Label layer 90 must have sufficient body to lay flat and support itself straight out in a horizontal position, i.e., a flag effect. Also, label layer 90 has a fine toothed and/or slitted edge so as to tear in a substantially straight line perpendicular to the vertically continuous bar codes 62 and 64. In the preferred embodiment, label layer 90 is Kim Dura from Kimberly-Clark, but it can be any material which has the required characteristics. The bottom surface of label layer 90 is zone coated with adhesive layer 92. Adhesive layer 92 is affixed to a lengthwise section of label layer 90 and is not adjacent edge 74 or edge 76. A release liner 96 is affixed to adhesive layer 92 on the bottom of label 60b. The width of release liner 96 is equal to the width of double bar code label 60b.

The method of using the embodiment of the present invention shown in FIG. 11 is similar to the method of using previously described embodiments. Briefly, double continuous strip bar code label 60 is stored in roll form in a dispenser. A person wishing to attach a bar code label to a unit dose medication package pulls out a length of double continuous strip bar code label 60 and separates it from the roll by pressing down on a serrated edge of the dispenser. Next, the double continuous strip bar code label 60 is torn in half using perforation 78. Then one-half of double bar code label 60 is applied to a unit dose medication package by removing release liner 88, as shown on double bar code label 60a in FIG. 12, or by removing release liner 96, as shown on double bar code label 60b in FIG. 13. The exposed adhesive layer, layer 82 in FIG. 12 and layers 92 or 94 in FIG. 13, is affixed to a unit dose medication package. This same procedure is then repeated with the other half of double bar code label 60.

Figure 14:
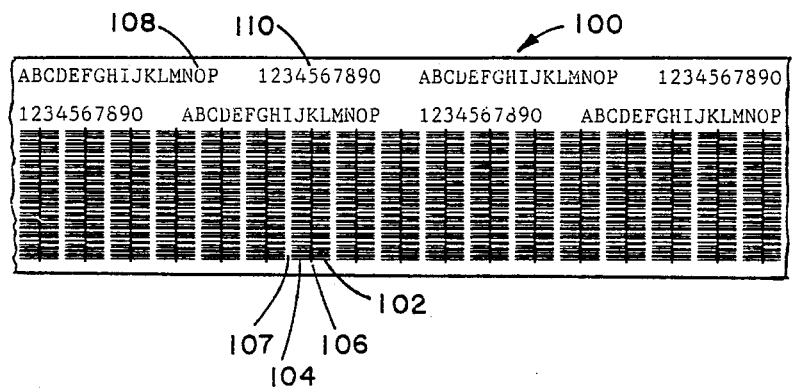
FIG. 14 is a plan view of an alternative embodiment of bar code indicia in accordance with the principles of the present invention.

FIG. 14 shows an alternative embodiment of a length of continuous strip bar code label 100. Label 100 has a multiplicity of bar codes 102 periodically printed transversely on the label. Bar codes 102 identify the drug type, unit dosage, delivery form, manufacturer, etc., just as bar code 19 does in FIGS. 1 and 2. Label 100 also has a multiplicity of bar patterns 104 periodically printed transversely on the label. Bar codes 102 and bar patterns 104 are grouped together on the label such that there is one bar pattern 104 in close proximity to each bar code 102 with only a guard bar 106 separating them. Each pair of bar codes 102 and bar patterns 104 are separated from each other by spaces 107. Bar patterns 104 are standard bar patterns that have a fixed distance and bar width and ratio between the minimum and maximum bar widths and are used as an index. Bar patterns 104 are used to correct for curvature of the bar code label 100 and are used as a reference mark for speed. Bar patterns 104 are the same on all medication packages while bar codes 102 change to reflect the particular medication. Bar patterns 104 must always be uniquely identifiable so that bar patterns 104 are not confused with bar codes 102. Label 100 also has a drug identifying name 108 and a drug identifying number 110 printed at periodic intervals along the length of the tape.

A bar code reader reads both bar code 102 and bar pattern 104 simultaneously. Guard bar 106 enables the reader to distinguish between bar pattern 104 and bar code 102. The spaces 107 enable the bar code reader to distinguish between each group of bar codes 102 and bar patterns 104. The reader is programmed to expect bar pattern 104 to have constant dimensions and to be read at a constant speed. If the reader reads bar pattern 104 as not equal to these constants, due to a curvature of the bar code label 100 or a change in the speed of reading the bar codes, the software of the reader can be adjusted in such a way as to compensate and thus bar code 102 will be read correctly. Therefore, constant bar pattern 104 allows a bar code reader to accurately read bar code 102 even if label 100 is on a curved surface and even if the bar code reader operator does not spend the same amount of time reading each label 100. The other aspects of label 100 are the same as label 100 discussed above. It should be noted that constant bar pattern 104 could also be a vertically continuous bar pattern and used in conjunction with bar code 19 on label 20. Bar pattern 104 could also be used in conjunction with any bar code label scheme to insure accurate readings of the codes regardless of the orientation or curvature of the bar code or the reading speed.

Figure 15:
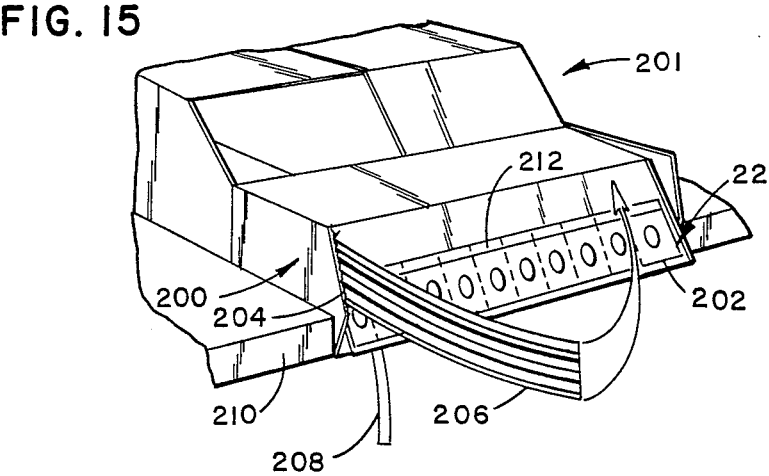
FIG. 15 is a perspective view of an embodiment of a bar code indicia dispenser in accordance with the principles of the present invention.

FIG. 15 shows an embodiment of a bar code label dispenser 200 placed in front of a pill bin 201 which is used to hold several unit does medication packages. Dispenser 200 can also be inside of pill bin 201. Dispenser 200 has a ledge 202 for holding a unit does medication package 22 and sharp edge 204 for separating a length of continuous strip bar code label 206 from the label stored in dispenser 200. Dispenser 200 also includes internal mechanism for peeling off a release line 208, which covers the adhesive on the back of continuous strip bar code label 206, as it is pulsed out from dispenser 200. The removed release liner 208 exits underneath the dispenser 200. Dispenser 200 can be attached to a shelf 210.

The label dispenser 200 shown in FIG. 15 facilitates the quick and easy attachment of bar code indicia to unit does medication packages. A length of continuous strip bar code label 206 equal to the length of the unit does medication package 22 on ledge 202 is pulled out from dispenser 200. As label 206 is pulled out, an internal mechanism of dispenser 200 peels off the release liner on label 206 so that the adhesive on the back of label 206 is exposed. Label 206 is then attached to unit does medication package 22 by pressing the exposed adhesive to area 212 above the pills in unit does medication package 22. Label 206 is then separated from the label stored in dispenser 200 by pressing it against sharp edge 204.

Figure 16:
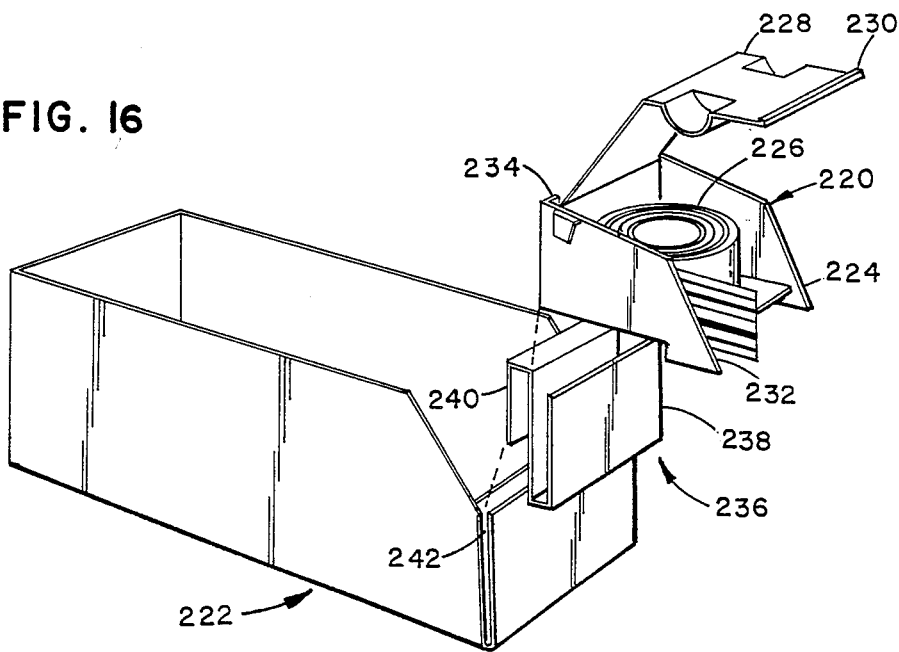
FIG. 16 is an exploded view of an alternative embodiment of a bar code indicia dispenser in accordance with the principles of the present invention.

FIG. 16 shows an exploded view of an alternative embodiment of a bar code label dispenser 220 and a pill bin 222. Dispenser 220 has a housing 224, for holding a roll of continuous strip bar code label 226, and a cover 228. Cover 228 has a ledge 230 for holding a unit dose medication package when cover 228 is in a closed position. Dispenser 220 has a sharp edge 232 for separating a length of continuous strip bar code label from roll 226. Dispenser 220 has a groove 234 which engages a first tongue 238 of coupler 236. Coupler 236 has a second tongue 240 which engages groove 242 of pill bin 222. Thus dispenser 220 is removably mounted on the front of pill bin 222. Dispenser 220 is used in the same manner as dispenser 200 shown in FIG. 15.

Figure 17:
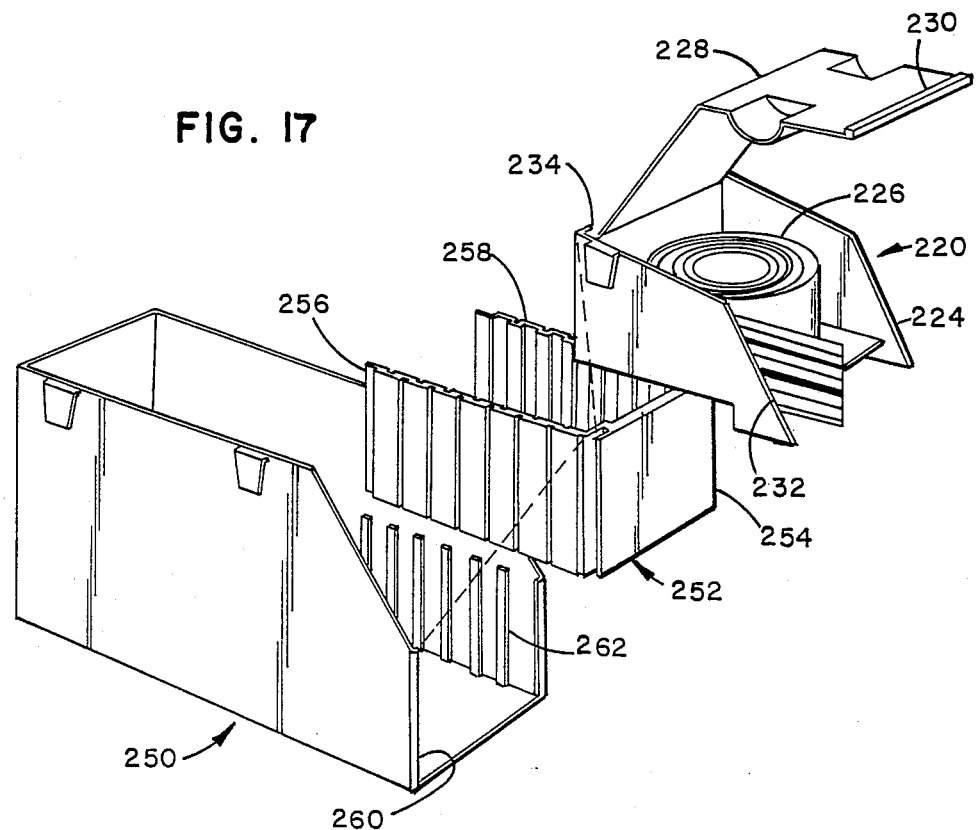
FIG. 17 is an exploded view of an alternative embodiment of a bar code indicia dispenser in accordance with the principles of the present invention.

FIG. 17 shows an exploded view of dispenser 220 and pill bin 250. Groove 234 of dispenser 220 engages tongue 254 of coupler 252. Coupler 252 has a multiplicity of tongues on sides 256 and 258 which engage a multiplicity of grooves on sides 260 and 262 of pill bin 250. Thus, dispenser 220 is removably and adjustably mounted on the front side of pill bin 250. Dispenser 220 is used in the same manner as dispenser 200 shown in FIG. 15.

Figure 18:
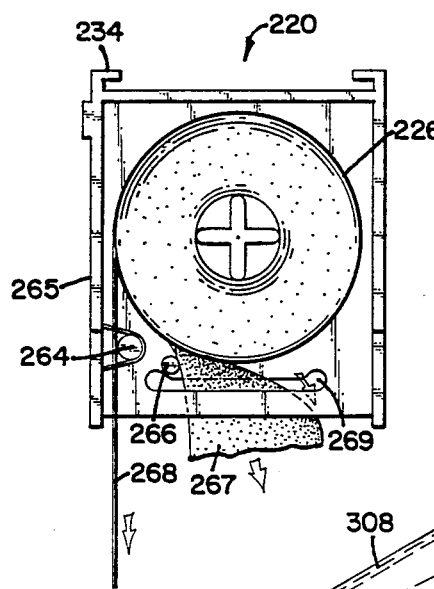
FIG. 18 is a top plan view illustrating an embodiment of a release mechanism in accordance with the principles of the present invention.

FIG. 18 is a top plan view of the dispenser 220 including a release mechanism which might be used in all of the above-discussed dispensers. The release mechanism includes a roller member 264 adjacent a side wall 265 of the dispenser 220 and a guide pin member 266 proximate the label roll 226. The guide pin member 266 facilitates separation of a release liner 267 from the continuous bar code label 268. In addition, the guide pin member 266 facilitates movement of the release liner 267 through an opening 269 in a bottom surface of the label dispenser 220.

Figure 19:
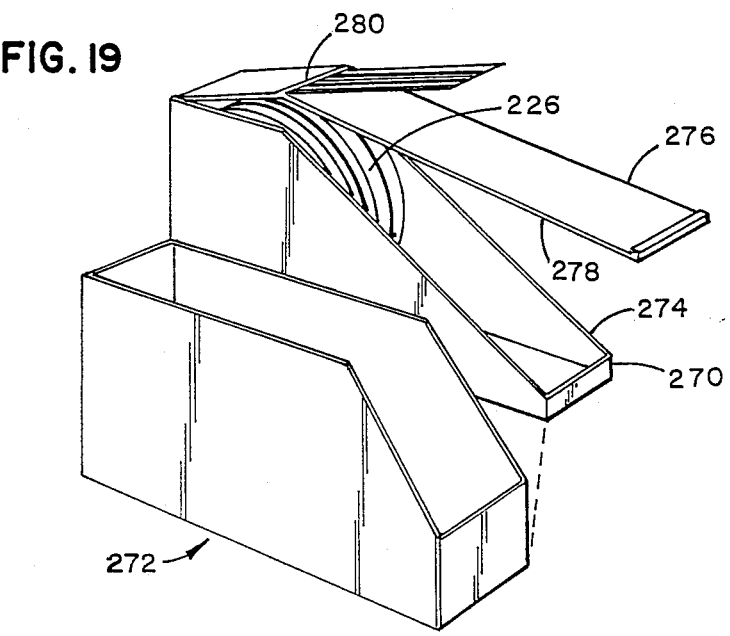
FIG. 19 is an exploded view of an alternative embodiment of a bar code indicia dispenser in accordance with the principles of the present invention.

FIG. 19 shows an exploded view of an alternative embodiment of a bar code indicia dispenser 270 and a pill bin 272. Dispenser 270 has a housing 274, for holding a roll of continuous strip bar code label 226, and a cover 276. Cover 276 has a ledge 278 for holding a unit does medication package when cover 276 is in a closed position. Dispenser 270 has a sharp edge 280 for separating a length of continuous strip bar code label from roll 226. Dispenser 270 is placed next to pill bin 272 and is used in a similar manner as dispenser 200 shown in FIG. 15.

Figure 20:
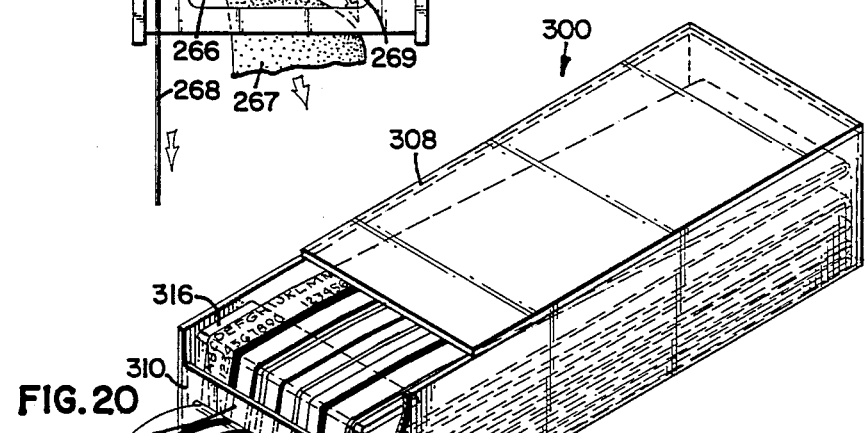
FIG. 20 is an alternate embodiment of a bar code dispenser cartridge in accordance with the principles of the present invention.
Figure 21:
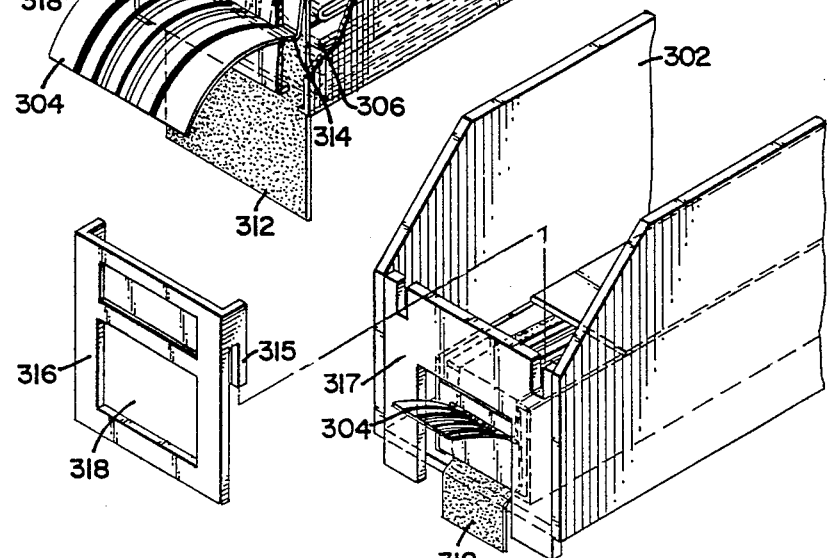
FIG. 21 is a partial, exploded view of a pill bin including the bar code dispenser cartridge illustrated in FIG. 20.

FIGS. 20 through 21 illustrate an alternative embodiment of a label dispenser 300 for use with a pill bin 302. The dispenser includes a length of continuous bar code label 304 which is fan folded at locations 306 in a housing 308. The housing 308 includes a front end 310 having an opening for removal of the continuous bar code label 304. A release liner 312 is separated from the continuous bar code label 304 by sharply bending the bar code label 304 at a location 314. A sharp corner is caused by the cooperation of wall members 316 and 318. The release liner 312 is exited through an opening in a bottom surface of the continuous bar code label 304. As the continuous bar code label 304 is removed from the housing 308, the fan folded continuous bar code label will unfold. As illustrated in FIG. 21, the continuous bar code label dispenser 300 is inserted into a bottom portion of the pill bin 302. A front plate member 316 is attached to a front wall member 317 of the pill bin 302 to cover up the end of the continuous bar code label housing 308. The front plate 316 including hook members 315 for cooperating with grooves of the front wall member 317. The front plate member 316 includes an opening 318 for removal of the continuous bar code label 304. The pill bin 302 might include a false flooring allowing for insertion of the dispenser 300 therein. A particularly advantageous feature of the fan folded cartridge is that the fan folded approach allows significantly more bar code label to be stored in such a cartridge.

Figure 22:
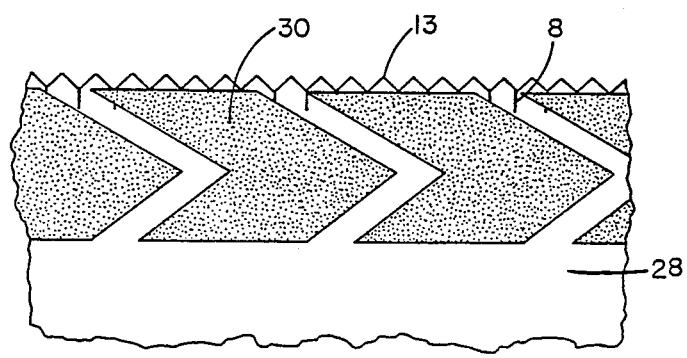
FIG. 22 is a plan view of an alternate embodiment of the bar code label illustrating the adhesive arranged in a non-continuous chevron pattern.

Illustrated in FIG. 22 is an embodiment of a preferred arrangement of the adhesive layer 30 on the backside of the label layer 28 intermediate of the label layer 28 and the releasable backing 32. The adhesive layer 30 is shown as being non-continuous. The adhesive layer 30 is applied in a repeating chevron-type pattern. This arrangement accommodates the differences in the length of the label layer 28 and the releasable backing 32 when rolled or fan folded.

In one preferred embodiment, the encoded bar code is interleaved 2 of 5, although any type of encoded bar code might be used with the present invention. In some embodiments, the encoded bar code will represent an 11-character National Drug Code (NDC). In a preferred embodiment of the present invention, a check character is present in the encoded bar code for ensuring accuracy in reading of the encoded bar code. The check character might be calculated by using the universal product code (UPC) check character generation algorithm. It will be appreciated that the present invention might be utilized with any number of different methods and techniques for encoding bar codes.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A bar code bearing medium, comprising:
    a continuous flexible strip of material having a length and means for facilitating tearing of the material in a straight line transversely of the length of the material, the material having first and second oppositely facing surfaces at least one of which is capable of bearing bar code indicia thereon;
    an adhesive layer affixed to one of the first and second surfaces; and
    bar code indicia printed on one of the first and second surfaces of the material, whereby a continuous strip bar code label is formed which can be readily separated into individual bar code labels of various lengths by tearing the continuous strip bar code label transversely of its length.

2. A bar code bearing medium according to claim 1, wherein the bar code indicia is printed lengthwise along the material.

3. A bar code bearing medium according to claim 1 further comprising a removable backing attached to the adhesive layer.

4. A bar code bearing medium according to claim 1 further comprising:
    a nonremovable backing attached to a first lengthwise section of the adhesive layer; and
    a removable backing attached to a second lengthwise section of the adhesive layer.

5. A bar code bearing medium according to claim 1, wherein the facilitating means includes edge means extending along the length of the material.

6. A bar code bearing medium according to claim 1, wherein the bar code indicia comprises a multiplicity of distinct bar codes and further comprising means for separating the bar code bearing medium into a multiplicity of pieces, each piece having a bar code printed on it.

7. A bar code indicia bearing medium which comprises:
    a continuous strip label having a width, a length, a first and second edge and a top surface capable of being printed on;
    an adhesive layer affixed to a lengthwise section of the bottom surface of the continuous strip label, the adhesive layer having a width less than the width of the continuous strip label;
    a removable backing, having a width at least as wide as the width of the adhesive layer, attached to the adhesive layer; and
    a bar code printed on the top surface of the continuous strip label, whereby a continuous strip bar code label is formed which can be separated into individual bar code labels of various lengths.

8. A bar code indicia bearing medium according to claim 7, wherein the removable backing has a width equal to the width of the continuous strip label.

9. A bar code indicia bearing medium according to claim 7, wherein the lengthwise section is disposed proximate the first edge of the continuous strip label.

10. A bar code indicia bearing medium according to claim 7, further comprising an identifying number printed on the top surface of the continuous strip label at periodic intervals along the length of the continuous strip label.

11. A bar code indicia bearing medium according to claim 7, further comprising an identifying name printed on the top surface of the continuous strip label at periodic intervals along the length of the continuous strip label.

12. A bar code indicia bearing medium according to claim 7, wherein the continuous strip label is capable of supporting itself in a horizontal, flat position.

13. A bar code indicia bearing medium according to claim 7, wherein the bar code is printed lengthwise on the top surface of the continuous strip label.

14. A bar code indicia bearing medium according to claim 7, wherein the first edge of the continuous strip label is a toothed edge so that the continuous strip label can easily be torn in a straight line substantially perpendicular to the length of the continuous strip label.

15. A combination of a bar code bearing medium and dispenser, comprising:
    a continuous flexible strip of material having a length and means for facilitating tearing of the material transversely of the length of the material, the material having first and second oppositely facing surfaces at least one of which is capable of bearing bar code indicia thereon;
    an adhesive layer affixed to one of the first and second surfaces;
    bar code indicia printed on one of the first and second surfaces of the material, whereby a continuous strip bar code label is formed which can be readily separated into individual bar code labels of various lengths by tearing the continuous strip bar code label transversely of its length;

a dispenser, having a front side and a back side, capable of housing a roll of the continuous flexible material including means located on the dispenser for separating a length of the continuous flexible material from the roll of the continuous flexible material.

16. A combination according to claim 15, wherein the dispenser has a groove on the back side and further comprising a coupling member having two tongues, the first tongue sized to engage the groove of the dispenser and the second tongue sized to engage a groove in a container so that the dispenser can be removably attached to the container.

17. A combination according to claim 15, wherein the dispenser has a groove on the back side and further comprising a coupling member having a front and a back side, a tongue on the front side sized to engage the groove of the dispenser and multiplicity of tongues on both sides sized to engage a multiplicity of grooves in the sides of a container so that the dispenser can be adjustably and removably attached to the container.

18. A combination according to claim 15 further comprising a removable backing layer attached to the adhesive layer.

19. A combination according to claim 18 further comprising means attached to the dispenser for removing the removable backing layer when a length of continuous flexible material is pulled out from the roll of continuous flexible material.

20. A combination according to claim 19 further comprising means for outputting the removed removable backing from the dispenser.

21. A combination according to claim 15 further comprising means for attaching the dispenser to a shelf.

22. A combination according to claim 15 wherein the separating means includes a sharp edge of the dispenser.

23. A method of making bar code labels which comprises the steps of:

affixing an adhesive layer to a lengthwise section of a bottom surface of a flexible, continuous strip label having a width, a first and second edge, the first edge being a toothed edge, and a top surface capable of being printed on, the lengthwise section being adjacent to the first edge of the continuous strip label, the adhesive layer having a width less than the width of the continuous strip label;

attaching a removable flexible backing, having a width at least as wide as the width of the adhesive layer, to the adhesive layer; and printing a bar code on the top surface of the continuous strip label, whereby a continuous strip bar code label is formed which comprises a plurality of individual bar code labels.

24. A method according to claim 23 wherein the bar code is printed lengthwise on the top surface of the continuous strip label.

25. A method according to claim 23 further comprising the step of printing an identifying number on the top surface of the continuous strip label at periodic intervals along the length of the continuous strip label.

26. A method according to claim 23 further comprising the step of printing an identifying name on the top surface of the continuous strip label at periodic intervals along the length of the continuous strip label.

27. A method according to claim 23 wherein the continuous strip label is capable of supporting itself in a horizontal, flat position.

28. A method of attaching the bar code indicia to items which comprises the steps of:

pulling out a length of flexible, continuous strip bar code label having a first and second toothed edge, a bar code printed on a top surface and an adhesive layer on a bottom surface from a roll of the continuous strip bar code label housed in a dispenser;

separating the length of the continuous strip bar code label from the roll by pressing the label against a serrated edge of the dispenser; and affixing the separated length of continuous strip bar code label to an item by pressing the adhesive layer on the bottom surface of the length of continuous strip bar code label to the item.

29. A method according to claim 28 further comprising the step of peeling off a removable backing which covers the adhesive layer on a bottom surface of the length of continuous strip bar code label from the length of continuous strip bar code label separated from the roll.

30. A bar code bearing medium, comprising:

a material having a surface capable of bearing bar code indicia thereon;

first bar code indicia printed on the surface of the material for identifying an item which the material is connected to; and second bar code indicia having constant dimensions and printed on the surface of the material so that a bar code reader can compare the reading from the second bar code indicia to the known constant dimensions and adjust the reading of the first bar code indicia to correct for the curvature of the material and different speeds of reading the bar codes.

31. A bar code bearing medium according to claim 1, wherein the material further includes alphanumeric indicia printed on one of the first and second surfaces of the material in repetitive fashion along the length of the continuous strip bar code label.

32. A bar code bearing medium according to claim 1, wherein the bar code indicia is printed transversely of the continuous strip bar code label.

33. A combination according to claim 15, wherein the dispenser further includes means for holding an item to which the length of continuous flexible material is to be adhesively attached.

* * * * *